United States Patent
Holm et al.

(10) Patent No.: US 8,134,989 B2
(45) Date of Patent: Mar. 13, 2012

(54) SESSION CONTROL IN SIP-BASED MEDIA SERVICES

(75) Inventors: Jan Holm, Örbyhus (SE); Johan Svedberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 12/532,301

(22) PCT Filed: Mar. 21, 2007

(86) PCT No.: PCT/EP2007/052682
§ 371 (c)(1),
(2), (4) Date: Feb. 10, 2010

(87) PCT Pub. No.: WO2008/113417
PCT Pub. Date: Sep. 25, 2008

(65) Prior Publication Data
US 2010/0142411 A1 Jun. 10, 2010

(51) Int. Cl.
*H04Q 7/24* (2006.01)
(52) U.S. Cl. ........ 370/338; 370/352; 370/252; 370/259; 709/203
(58) Field of Classification Search .......... 370/352, 370/296, 338; 709/203
See application file for complete search history.

(56) References Cited

U.S. PATENT DOCUMENTS

| 2006/0146831 | A1* | 7/2006 | Argyropoulos et al. | 370/394 |
| 2008/0233990 | A1* | 9/2008 | Jen | 455/518 |
| 2010/0020790 | A1* | 1/2010 | Pallares Lopez et al. | 370/352 |
| 2010/0098056 | A1* | 4/2010 | Falkena et al. | 370/352 |

FOREIGN PATENT DOCUMENTS
EP  1 626 591 A  2/2006

OTHER PUBLICATIONS

Donovan, J et al. Session Timers in the Session Initiation Protocol (SIP), IETF CH Apr. 2005 XP015041971.
Open Mobile Alliance (OMA). POC User Plane. Internet Citation http://member.openmobilealliance.org/ftp/public_documents/POC/Permanent_documents/OMA-Ts-PoC-UserPlane-V2_0-20051110-D.zip. Nov. 10, 2005.
3GPP 3rd Generation Partnership Project. Technical Specification Group Core Network and Terminals; IP multimedia call control protocol based on Session Initiation Protocol (SIP) and Session Description Protocol (SDP); Stage 3 (Release 7). 3GPP TS 24.229 v7.7.0 (Mar. 20, 2007).

* cited by examiner

*Primary Examiner* — Duc C Ho

(57) ABSTRACT

A method of keeping a SIP application server advised of the status of a SIP client, where the SIP application server lies within both the signaling plane and the media plane for SIP clients and is responsible for accepting SIP clients into and removing them from a SIP session, the method comprising sending keep-alive messages from the SIP client to the SIP application server across the media plane.

24 Claims, 2 Drawing Sheets

SESSION CONTROL IN SIP-BASED MEDIA SERVICES

TECHNICAL FIELD

The present invention relates to session control in SIP-based media services and in particular, though not necessarily, in Push-to-Talk services. More particularly, the invention relates to the provision of a keep-alive mechanism for such services.

BACKGROUND

Walkie-talkie type services have long proved popular amongst users who wish to communicate brief messages quickly between one another. Walkie-talkie type services are sometimes known as Push-to-talk (PTT) services. Conventionally, such PTT services have been provided by two-way portable radios which utilise a dedicated part of the radio spectrum, but which only allow users to communicate with a small group of pre-selected users who utilise similar terminals and who are within range of the relatively short operating range of the radios. More recently, services have been introduced into the United States which piggy-back on the existing cellular telephone infrastructure. However, these services have been proprietary in nature and have not allowed users to communicate between different operator networks.

In an attempt to broaden the use of PTT services, an industry grouping known as the Open Mobile Alliance (www.openmobilealliance.org) has been established with the aim of standardising suitable protocols which will allow internetwork operability for walkie-talkie services offered over cellular networks. The service established by the various standards is known as Push-to-talk Over cellular (PoC). PoC makes use of the IP Multimedia Subsystem (IMS) to handle the setting up and control of PoC sessions via PoC application servers (acting as SIP ASs). PoC proposes that associated speech data will be transported over a packet switched access technology. In the case of GSM and UMTS, this will be the General Packet Radio Service (GPRS) access technology. In other network architectures, analogous packet switched access technologies will be utilised for transporting talk data. Push to Talk services may also be offered over circuit switched access networks, although this is not the preferred option. The current state of PoC is set out in Release 1.0. The requirements for PoC Release 2 are now being laid out. PoC Release 2 will extend PoC to include multimedia and not just speech.

A PoC AS exists both within the signalling plane and the media plane. It implements a Media Resource Fund on (MRF) comprising a) a Media Resource Function Processor (MRFP) in the media plane node which implements all media-related functions and b) a Media Resource Functon Controller (MRFC) in the signalling plane node that acts as a SIP User Agent to the S-CSCF. Whilst the interface between MRFC and MRFP is not yet standardised, if standardised likely to be based on H.248. It is also likely that the actual (audio) media passing through the MRFP in the case of PoC will use the Real-Time Transport Protocol (RTP) to packetise data or the Message Session Relay Protocol (MSRP) to transport files.

PoC uses the concept of "floor control" to dictate which PoC client involved in a PoC session that may send media at any given time. The MRFC acts as the Media-floor Control Entity for a PoC session. Without permission a PoC Client does not send any type of media, not even media packets indicating silence. Floor control is handled by the allocated PoC application server using the Media Burst Control Protocol (MBCP). MBCP messages are transported across the media layer. Once a PoC session has been established, a PoC client requests the "floor" by sending a MBCP Media Burst Request message to the PoC AS. Assuming that no other PoC client currently has the permission to send media, the PoC AS accepts the request and returns a MBCP Media Burst Granted message to the PoC client.

MBCP defines a "Media Burst Idle" message which is sent out to all participants in a PoC session when no PoC client currently has the permission to send Media. A PoC client receiving this message learns that it can request permission to send media if desired. The PoC AS grants a PoC client the floor for some predefined period, e.g. 10 seconds. After that, the PoC AS revokes the permission to send media and sends out a MBCP Media Burst Idle message to participants. If no participant requests permission to send media, the PoC AS will send out further Media Burst Idle messages at increasing intervals of time, up to some fixed maximum interval.

For a number of reasons a PoC session can "hang". This is possible, for example, because a PoC client looses radio coverage. In such a case network entities, and in particular SIP proxies within the IMS, may retain state information when this is no longer necessary. Perhaps more importantly, a user may be charged beyond the point when he or she has lost access to a service. It is therefore desirable to provide some kind of keep alive mechanism which allows network entities to learn when a session has hung.

The problems identified above are not restricted to PoC, but are also likely to apply to other IMS enabled services and indeed to non-IMS services which rely upon SIP to establish and control sessions between end-points.

IETF RFC 4028 titled "Session Timers in the Session Initiation Protocol (SIP)" provides one such mechanism which could be applied to PoC sessions. The mechanism requires that a participating SIP client send SIP INVITE or UPDATE messages across the SIP signalling path at regular intervals. In order to avoid overloading the signalling network, it is recommended that the interval at which the keep alive messages are sent is of the order of 30 minutes. However, as IMS sessions in general and PoC sessions in particular are expected to be relatively short lived, application of this mechanism to IMS will still cause state information to be retained within the network long after it is required, and will do little to address the overcharging issue.

SUMMARY

According to a first aspect of the present invention there is provided a method of keeping a SIP application server advised of the status of a SIP client, where the SIP application server lies within both the signalling plane and the media plane for SIP clients and is responsible for accepting SIP clients into and removing them from a SIP session. The method comprises sending keep-alive messages from the SIP client to the SIP application server across the media plane.

As a media plane message can be shorter than an equivalent signalling plane (that is SIP) message, and traverses relatively few nodes, the time interval at which keep-alive messages can be sent is shorter without unduly loading the signalling network It will be appreciated that the invention is applicable in particular to half-duplex sessions. In such sessions, the SIP client sends keep-alive messages only when it is not sending media or is not allowed to send media by the SIP application server. When the SIP client is sending media, this represents an implicit keep-alive mechanism.

It may be necessary to negotiate a keep-alive timer value between the SIP client and the SIP application server, said timer value defining the intervals at which keep-alive messages are sent from the SIP client. The SIP application server runs a timer set to expire at said timer value, wherein, if the SIP application server has not received a keep-alive message before the expiry of the timer, the SIP client is removed from a SIP session in which it is engaged.

In a typical application of the invention, the SIP application server is located within an IP Multimedia Subsystem network, and said keep-alive messages are Media Burst Control Protocol messages. More preferably, the SIP application server is a Push-to-talk over Cellular application server responsible for floor control, and said SIP client is a Push-to-talk over Cellular client involved in a Push-to-talk over Cellular session.

Preferably, keep-alive messages are sent when the SIP client does not have permission to send media. When the SIP client does have permission to send media, no keep-alive messages are sent.

Preferably, when no SIP client involved in a Push-to-talk over Cellular session has permission to send media and the SIP application server receives a keep-alive message, the application server send an acknowledgement to the SIP client, otherwise sending no acknowledgement.

Preferably, when a SIP client other than the client sending the keep-alive messages has permission to send media, the SIP application server does not specifically acknowledge receipt of the messages, and the SIP client sending the keep-alive messages considers the receipt of media as an implicit acknowledgement. When the SIP client has permission to send media, no keep-alive messages and explicit acknowledgements are sent.

In an embodiment of the invention, said keep-alive messages are dummy RTP media packets.

According to a second aspect of the present invention there is provided a SIP client arranged in use to send keep-alive messages to a SIP application server which is responsible for accepting SIP clients into and removing them from SIP sessions, the keep-alive messages being sent across the media plane.

According to a third aspect of the present invention there is provided a SIP application server which is responsible for accepting SIP clients into and removing them from SIP sessions, the server being arranged in use to receive keep-alive messages from a SIP client over the media plane.

DETAILED DESCRIPTION

Figure 1:
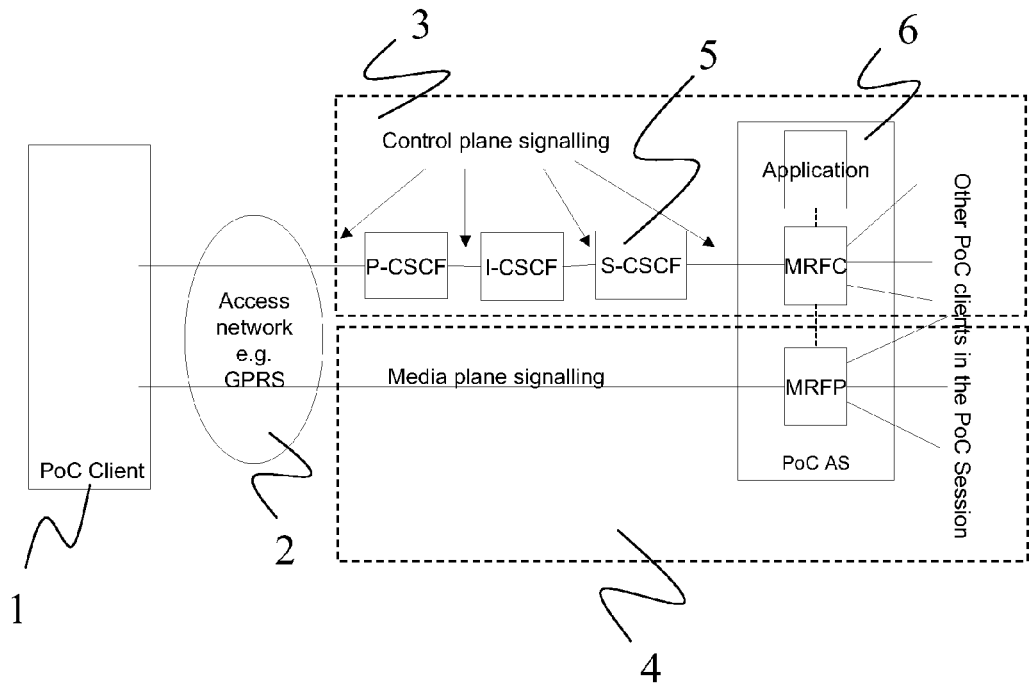
FIG. 1 illustrates schematically an IMS network including a PoC application server.

FIG. 1 illustrates schematically an IMS network comprising various network nodes, including application servers and SIP proxies. This architecture will be well known to those of skill in the art. For the purpose of this discussion it is sufficient to note that an IMS client 1, i.e. a user terminal, is attached to an access network 2 which is likely to be a cellular telephone network such as a GSM or 3G network. Via the access network, the IMS client communicates with an IMS core network 3 and with a transport network 4. An IMS service session is established by the IMS client exchanging SIP signalling with entities within the IMS core network and with peer IMS clients. The IMS core network is linked to the transport network, with the former making available resources within the transport network for use by the IMS client as required.

Considering further the IMS core network, the IMS client is allocated a Serving Call Session Control Function (S-CSCF) 5. The S-CSCF is located within the home IMS domain of the subscriber using the IMS client, regardless of whether the client accesses the IMS from within the home domain or via a "visited" domain. The CSCFs (including the S-CSCF) handle reachability, authentication and authorisation functions in respect of subscribers. Provision of services is handled by SIP Application Servers (ASs). FIG. 1 illustrates a PoC AS 6 which provides the service logic for the PoC service. As described above, the PoC AS implements an MRF comprising an MRFC and an MRFP. User media flows through the MRFP.

When a subscriber wishes to establish a PoC session with a peer user, the subscriber's IMS client sends a SIP INVITE to the S-CSCF via the P-CSCF which represents the subscriber's point of attachment to the IMS. Upon detecting that the INVITE relates to a PoC session, the Initial Filter Criteria installed at the S-CSCF for the subscriber cause the INVITE to be routed to the PoC server. The PoC server performs the required actions, including initialising charging and allocating resources, adds itself into the SIP path, and returns the INVITE to the S-CSCF. The S-CSCF forwards the INVITE onwards towards the peer user.

It is proposed here to introduce a keep-alive mechanism which involves the sending of keep-alive messages across the media plane between PoC clients and the PoC AS. A variety of mechanisms/protocols can be used to convey such messages. It might be appropriate for example to specify a new MBCP message. Alternatively, where the transport protocol is RTP, dummy RTP Media packets can be used. A dummy RTP packet is essentially just an RTP packet without a payload. This implementation would require that the PoC client be modified to allow the sending of media even when it does not have explicit permission.

Figure 2:
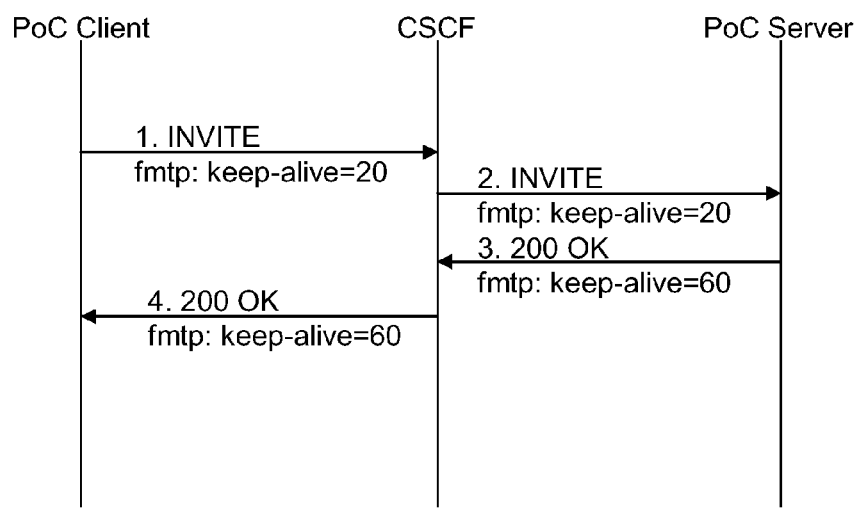
FIG. 2 illustrates signalling associated with a keep-alive timer value negotiation for a PoC session.

A pre-requisite for this mechanism is the negotiation of a keep-alive message interval between a PoC client and the PoC AS (see FIG. 2). Thus, when a PoC Client initiates, joins, or rejoins a PoC Session, the PoC client includes a suggested time interval using the fmtp parameter ("fmtp" is a standardised parameter that an application can use to add parameters in the Session Description Protocol (SDP) part of the SIP INVITE or REINVITE). The time interval is negotiated per Media-floor Control Entity (multiple such Entities may be present in the case of multi-media, one Entity per media type, although one Entity can handle multiple streams).

FIG. 2 shows the negotiation procedure in the signalling plane using SIP (the term "CSCF" denotes the P-CSCF, I-CSCF, and S-CSCF complex as appropriate), where the steps of the flow are as follows:
  1. The PoC Client sends a SIP INVITE request to the CSCF. The SIP INVITE request contains the information specified by the [OMA-PoC-CP] and an additional fmtp with the suggested keep-alive message interval. In the example, this value is set to 20 seconds.
  2. The CSCF forwards the SIP INVITE request using the mechanism specified in [TS24.229] to the PoC AS.
  3. The PoC AS evaluates the received suggested keep-alive message interval and returns a value in the SIP 200 OK response to the S-CSCF. The PoC AS starts a timer supervising the reception of keep-alive message from the PoC client.

4. The CSCF forwards the 200 OK to the PoC client. The PoC client starts a timer based on the value received from the PoC Server. When the timer expires the PoC client sends the keep-alive message The time interval can be re-negotiated during the PoC session and may be different for each Media-floor Control Entity.

Figure 3:
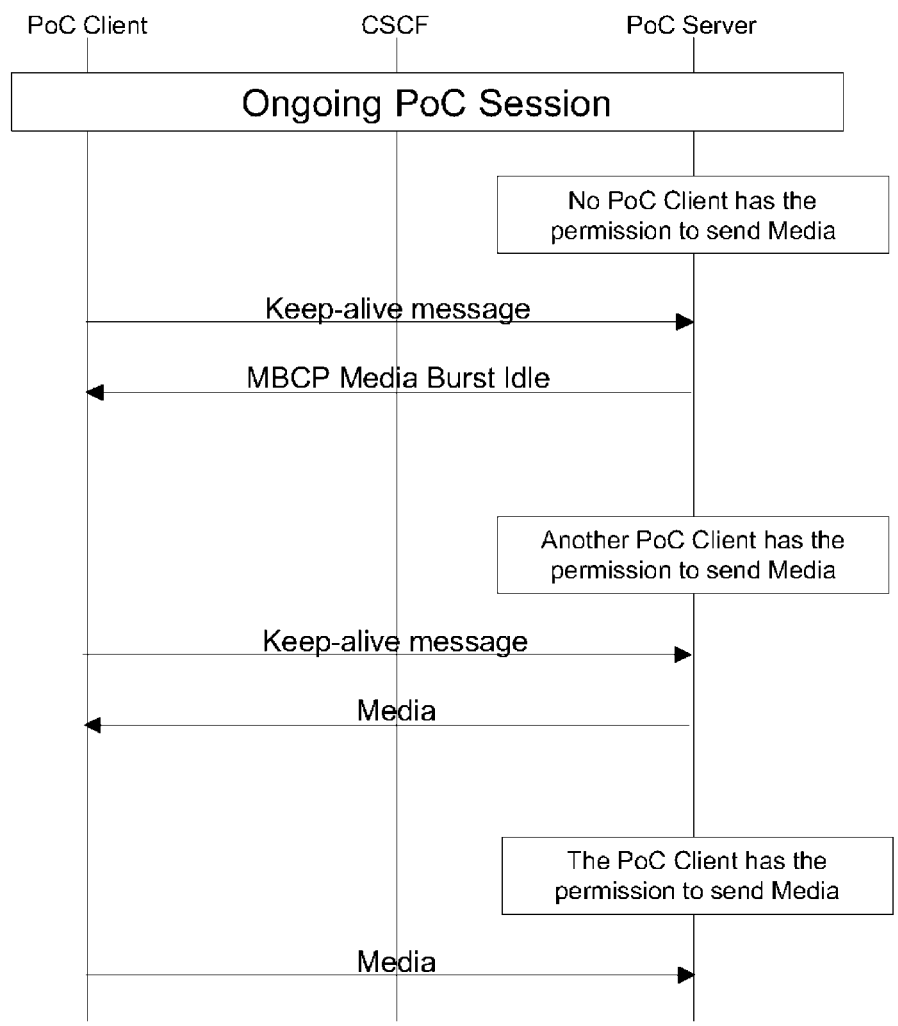
FIG. 3 illustrates signalling associated with a keep-alive mechanism for PoC for three different session cases.

It is recognised that it is not necessary for the PoC client to send keep-alive messages to the PoC AS for all session cases. Signalling loads can be decreased by using media as either the keep-alive message or the keep-alive response, where media is being sent between the PoC client and the PoC AS. With reference to FIG. 3, three session cases are illustrated.

Case 1): No PoC Client Connected to the Media Floor Control Entity Currently has Permission to Send Media.

According to prior art solutions, in this case the PoC AS would send out MBCP Media Burst Idle messages at increasing intervals. In contrast, it is proposed here to send a Media Burst Idle message only in response to each received keep-alive message. The PoC client treats the Media Burst Idle message as an acknowledgement of its keep-alive message, and resets its timer to zero. If the timer in the PoC AS expires before a keep-alive message is received, the PoC AS removes the PoC client from the PoC session.

Case 2): Another PoC Client Connected to the Media Floor Control Entity Currently has Permission to Send Media.

The PoC client sends keep-alive messages according to the agreed time interval. The PoC AS is thus aware that the PoC client remains "connected" and will continue to send it media. The PoC client receives the media, and is thus aware that the PoC AS has received its last keep-alive message. This represents an implicit acknowledgement of the keep-alive message and the PoC client resets its timer to zero. Again, if the timer in the PoC Server expires without receipt of a keep-alive message, the PoC AS removes the PoC client from the PoC session.

Case 3): The PoC Client Currently has Permission to Send Media.

In this case, there is no need for the PoC client to send the keep-alive messages. It sends the media, and the PoC server treats the media as an implicit keep-alive message. There is no need to maintain a new timer at the PoC AS. As described above, according to the current state of PoC, the PoC AS will maintain a timer with a predefined time period, at the expiry of which the floor is removed from the PoC client. In addition to this timer, according to the state of the art PoC proposals, the PoC AS maintains a further timer to detect loss of connection on the part of a PoC client. This mechanism starts a timer every time media is received from the PoC client with permission to send media (a PoC client should always send media if it has the floor—in the event that the user is not speaking, silence RTP packets are sent). If the timer expires before media is received, the PoC client is removed from the session.

It will be appreciated by the person of skill in the art that various modifications may be made to the above described embodiments without departing from the scope of the present invention. For example, whilst the example presented above concerns the PoC service, the invention may be applied to other IMS services including voice and video telephony. Indeed, the invention may be applied to non-IMS, but still SIP-based services. In particular, the invention is applicable to half-duplex services.

The invention claimed is:

1. A method of keeping a SIP application server advised of the status of a SIP client, where the SIP application server lies within both the signalling plane and the media plane for SIP clients and is responsible for accepting SIP clients into and removing them from a SIP session, the method comprising:
   negotiating a timer value between the SIP client and the SIP application server using SIP signalling across the signalling plane; and
   sending keep-alive messages from the SIP client to the SIP application server across the media plane, the timer value defining the intervals at which the keep-alive messages are sent from the SIP client.

2. The method according to claim 1, wherein said SIP session is a half-duplex session.

3. The method according to claim 2, wherein the SIP client sends keep-alive messages only when it is not sending media or is not allowed to send media by the SIP application server.

4. The method according claim 1, wherein said SIP application server sends an acknowledgement to the SIP client over said media plane when it has received a keep-alive message.

5. The method according to claim 1, wherein said SIP application server sends an acknowledgement to the SIP client when it has received a keep-alive message and it does not have media to send to the SIP client.

6. The method according to claim 1, wherein said SIP application server is located within an IP Multimedia Subsystem network.

7. The method according to claim 6, wherein said keep-alive messages are Media Burst Control Protocol messages.

8. The method according to claim 6, wherein said SIP application server is a Push-to-talk over Cellular application server responsible for floor control, and said SIP client is a Push-to-talk over Cellular client involved in a Push-to-talk over Cellular session.

9. The method according to claim 8 and comprising sending keep-alive messages when the SIP client does not have permission to send media, and, when the SIP client does have permission to send media, not sending the keep-alive messages.

10. The method according to claim 9 and comprising, when no SIP client involved in the Push-to-talk over Cellular session has permission to send media and the SIP application server receives a keep-alive message, sending an acknowledgement to the SIP client, otherwise sending no acknowledgement.

11. The method according to claim 9 and comprising, when the SIP client has permission to send media, no keep-alive messages and explicit acknowledgements are sent.

12. The method according to claim 1, wherein said keep-alive messages are dummy RTP media packets.

13. A method of keeping a SIP application server advised of the status of a SIP client, where the SIP application server lies within both the signalling plane and the media plane for SIP clients and is responsible for accepting SIP clients into and removing them from a SIP session, the method comprising:
   negotiating a timer value between the SIP client and the SIP application server using SIP signalling across the signalling plane;
   sending keep-alive messages from the SIP client to the SIP application server across the media plane, the timer value defining the intervals at which the keep-alive messages are sent from the SIP client;
   wherein said SIP application server is located within an IP Multimedia Subsystem network;

wherein said SIP application server is a Push-to-talk over Cellular application server responsible for floor control, and said SIP client is a Push-to-talk over Cellular client involved in a Push-to-talk over Cellular session;

sending keep-alive messages when the SIP client does not have permission to send media, and, when the SIP client does have permission to send media, not sending the keep-alive messages;

when no SIP client involved in the Push-to-talk over Cellular session has permission to send media and the SIP application server receives a keep-alive, message, sending an acknowledgement to the SIP client, otherwise sending no acknowledgement; and when a SIP client other than the client sending the keep-alive messages has permission to send media, the SIP application server does not specifically acknowledge receipt of the messages, and the SIP client sending the keep-alive messages considers the receipt of media as an implicit acknowledgement.

14. A SIP client associated within a telecommunication network, comprising:

means for negotiating a timer value with a SIP application server which is responsible for maintaining SIP sessions with said SIP client using SIP signaling across a signaling plane within said telecommunication networks; and means for sending keep-alive messages to said SIP application server to maintain said SIP session, the keep-alive messages being sent across the media plane and at intervals dictated by said timer value.

15. The SIP client according to claim 14 and arranged in use to send keep-alive messages only when the client does not have permission to send media.

16. The SIP client according to claim 14, the SIP client being a Push-to-talk over Cellular client.

17. The SIP client according to claim 14, the client/server being arranged to send/receive keep-alive messages using the Media Burst Control Protocol.

18. A SIP application server which is responsible for accepting SIP clients into and removing from SIP sessions within a telecommunication network, the server comprising:

means for negotiating a timer value with a SIP client using SIP signaling across a signaling plane within said telecommunication networks; and means for receiving keep-alive messages from said SIP client to maintain said SIP session, the keep-alive messages being received across the media plane and at intervals dictated by said timer value.

19. The SIP application server according to claim 18, the server being a Push-to-talk over Cellular application server.

20. The SIP application server according to claim 18, wherein said keep-alive messages use Media Burst Control Protocol.

21. A method of keeping a SIP application server advised of the status of a SIP client, the method implemented by the SIP application server comprising the steps of:

where the SIP application server lies within both a signalling plane and a media plane for SIP clients and is responsible for accepting SIP clients into and removing them from a SIP session;

negotiating a timer value with the SIP client using SIP signalling across the signalling plane, where the negotiating step further comprises:

receiving a request from the SIP client where the request includes a suggested keep-alive interval;

evaluating the suggested keep-alive interval and determining the timer value which defines the interval at which keep-alive messages are to be sent from the SIP client; and forwarding the timer value to the SIP client where the SIP client upon receipt of the timer value starts a timer based on the received timer value; and receiving a keep-alive message sent from the SIP client that was sent across the media plane.

22. The method according to claim 21, wherein if none of the SIP clients have permission to send media then upon receiving the keep-alive message from the SIP client sending a Media Burst Idle message to the SIP client which treats the Media Burst Idle message as an acknowledgment to the sent keep-alive message and resets the timer.

23. The method according to claim 21, wherein if another SIP client currently has permission to send media then upon receiving the keep-alive message from the SIP client sending media to the SIP client which treats the received media as an acknowledgment of the sent keep-alive message and resets the timer.

24. The method according to claim 21, wherein if the SIP client currently has permission to send media then there is no need for the SIP client to send the keep-alive message and upon receiving the media from the SIP client treating the received media as an implicit keep-alive message.

* * * * *

UNITED STATES PATENT AND TRADEMARK OFFICE
CERTIFICATE OF CORRECTION

PATENT NO. : 8,134,989 B2
APPLICATION NO. : 12/532301
DATED : March 13, 2012
INVENTOR(S) : Holm et al.

It is certified that error appears in the above-identified patent and that said Letters Patent is hereby corrected as shown below:

IN THE SPECIFICATIONS:

In Column 1, Line 50, delete "Fund on" and insert -- Function --, therefor.

In Column 1, Line 53, delete "Functon" and insert -- Function --, therefor.

In Column 1, Line 57, delete "likely" and insert -- it is likely --, therefor.

In Column 2, Lines 60-61, delete "network" and insert -- network. --, therefor.

In Column 5, Line 7, delete "message" and insert -- message. --, therefor.

IN THE CLAIMS:

In Column 6, Line 19, in Claim 4, delete "according" and insert -- according to --, therefor.

In Column 7, Line 12, in Claim 13, delete "keep-alive," and insert -- keep-alive --, therefor.

Signed and Sealed this
Twenty-sixth Day of June, 2012

David J. Kappos
*Director of the United States Patent and Trademark Office*